July 17, 1956

L. SUVERKROP 2,754,794

GEARED ANGLE INDICATOR

Filed April 6, 1953

Lew Suverkrop,
INVENTOR.

BY

United States Patent Office 2,754,794
Patented July 17, 1956

2,754,794

GEARED ANGLE INDICATOR

Lew Suverkrop, Bakersfield, Calif.

Application April 6, 1953, Serial No. 347,098

7 Claims. (Cl. 116—124)

The present invention relates to an improvement in geared angle indicators such as that disclosed in Suverkrop Patent 2,231,036 and co-pending application Serial No. 625,549. The general purpose of the device is to increase accuracy of angle determinations obtainable by such indicators.

This application comprises a division and continuation-in-part of my pending application Serial No. 625,549, filed October 30, 1945.

Present-day methods and equipment make it commercially practicable to produce gears of high inherent accuracy. The pitch circle centers very nearly in the axis of rotation, the teeth are accurately spaced, and the tooth form gives nearly uniform angular movement in mating gears. Geared angle indicators heretofore have made use of a number of means, the intent of which was to derive full benefit of the accuracy in the gears. Teeth have been meshed tightly together, without clearance. Spring-loaded split gears have been used, seeking to eliminate backlash. Compared with what obtains where gears operate with suitable play, such means have defeated their purpose due to excess loads imposed on the gear teeth.

Such loads immediately alter effective tooth form and introduce inaccuracy even before the teeth are worn. Since the loads increase wear of the teeth, the alteration of tooth form and resultant inaccuracy become progressively worse. Moreover, if all the accuracy of the gears is to be reflected in readings obtainable by the indicator, consideration should be given to the fact that it is impossible to eliminate entirely all backlash or "drag" in a system involving a gear train. This is apparent from considering common practice with precise theodolites where no gears are employed, but angle readings are obtained direct from a graduated circle. Even in such instruments, best practice requires that drag be eliminated by turning always in only one direction.

From these considerations it is clear that where high and continued accuracy of angle indications is of prime importance, (1) the geared angle indicator should have proper play between meshing gears, and (2) angles determined by it should be obtained by measuring movement in one direction only. This is to say, only one flank of each tooth in the gear train should be used in angle determinations. Such is easily accomplished in a common dial indicator used for measuring linear distances, by having its gears operate direct against a spring load throughout the limited range measurable by such indicator. This is impossible however in an angle indicator of the type referred to above since there should be no limit to the number of full turns through which it may be caused to move.

In testing and using geared dial indicators fitted with proper play in meshing gears, prior to the development of the present invention, the results obtained did not reflect the accuracy known to be in the gears themselves, and the inaccuracies were variable. Investigation showed this to be caused by variations in the proximity of contact between the gear teeth, mainly variations in thickness of the lubricating film between them.

The present invention accomplishes its purpose in geared angle indicators by permitting a predetermined amount of play in the meshing gears, and at the same time imposing a suitable load on the teeth so as to insure their uniform contact with one another.

In the accompanying drawings illustrating this specification,

Geared angle indicators function by multiplying the movement being measured so that minute increments of the movement are more readily discernible against a fixed index mark.

Figure 1:
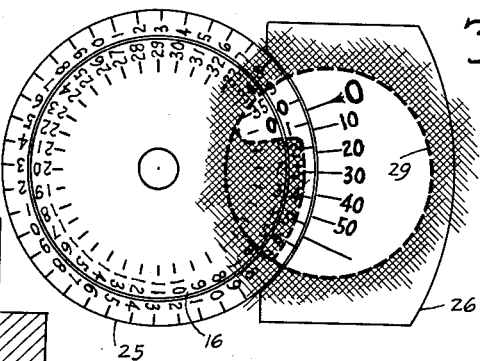
Fig. 1 is a vertical sectional elevation of an angle indicator embodying principles of the present invention, taken along the line A—A of Fig. 3 thereof, said view also showing part of a device covered by said pending application.

In the accompanying drawing, one exemplary type of instrument utilizing such geared angle indicator is shown, said instrument comprising a goniometer embodied in a transit useful for surveying purposes. The indicator is shown in Fig. 1 and is enclosed in a casing which, in said exemplary illustration, also comprises the base of said transit.

Referring specifically to the geared angle indicator 2, a vertical spindle 3 has a gear 8 formed preferably integral with the lower end thereof. The angular movement of said gear 8 is to be measured as spindle 3 is rotated relative to housing 1 or vice versa. Said gear 8 drives a gear train comprising successively gear 15, integral idler pinion 21 and gear 22, and the pinion 24. The disk 16 is secured to the gear 15 by means of sleeve 10 and rotates at the same speed as spindle gear 8. Disk 16 is provided with indicia to indicate tens of degrees. Another disk 25 which is cup-shaped in the specific illustration of Fig. 1 is secured to pinion 24 which is driven at nine times the speed of spindle gear 8. Disk 25 has a peripheral flange on which 40 divisions are arranged in four sets of ten, the divisions of each set being numbered from 0 to 9. By this construction each division on disk 25 represents an angular movement of the spindle gear 8 amounting to 1°, which may be read against a vernier plate 26.

Figure 2:
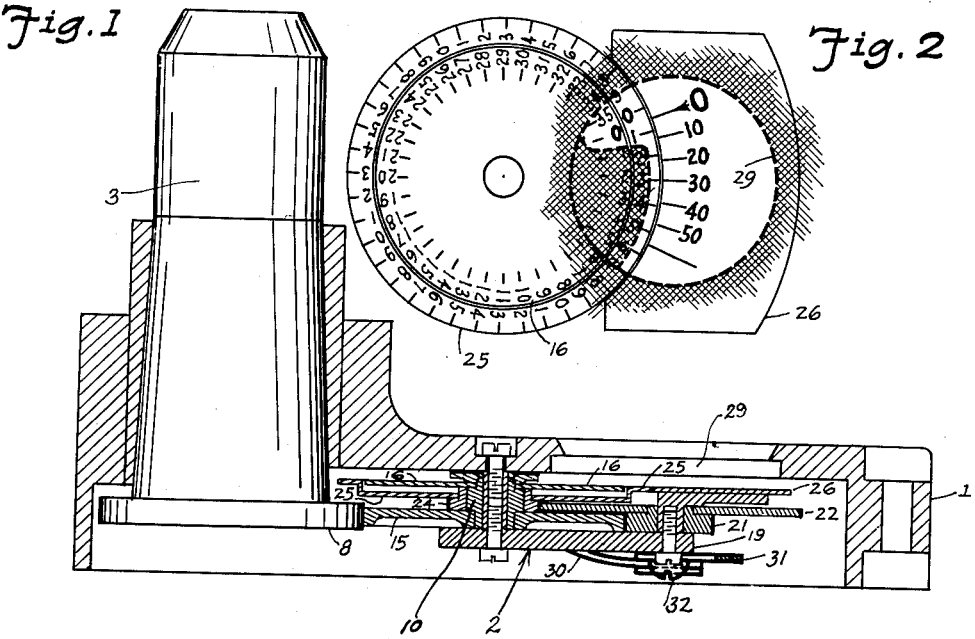
Fig. 2 is a plan view of an exemplary indication of angle which may be indicated by such a geared angle indicator.

As shown in Fig. 2, a window 29 in the top of housing 1 of the geared angle indicator is usually provided for convenient reading of angles indicated by adjacent significant figures on disks 16 and 25 and the divisions of disk 25 against the figured lines of the vernier plate 26. In the construction shown, goniometer plate or bridge 19 is secured to the housing 1 of the indicator; and, together, these parts serve in support of the moving parts of the indicator.

In the construction illustrated, a friction finger 30, formed from any suitable flexible material such as spring bronze wire of square cross-section, presses against an annular shoulder of disk 25. Friction finger 30 is secured in one end of the friction adjusting plate or lever 31. Lever 31 is secured to bridge 19 by two screws 32. By loosening screws 32, the form of lever 31 is such that pressure of friction finger 30 against disk 25 may be adjusted by partial rotation of lever 31 about one of the screws 32 as a pivot. It will be noted that one of said screws 32 passes through a curved slot 33 in adjusting plate 31, while the other screw passes through a circular hole which affords a pivot for one end of said plate. After adjusting the tension of friction finger 30, the screws 32 are tightened to maintain said tension.

In the construction shown, it will be seen that disk 25 serves as a brake drum for one of the terminal gears of the gear train and against which the friction finger 30 acts; but a brake drum solely for its purpose may be provided separately from disk 25, if desired. Such separate drum could be fixed to pinion 24, for example. It will be noted that the action of friction finger 30 is applied at a place in the gear train identical with the last indicating disk 25; and that this is also a place in the gear train where the "brake drum" of disk 25 is geared beyond disk 16. This is to say, advantageous construction may require driving a brake drum by a separate gear train, geared to and extending beyond the gear train of an angle indicator proper. Similarly, in a geared angle indicator having a number of disks, it may conceivably be advantageous to employ a number of brake drums with their friction fingers, at a number of places in or connected to the gear train of the indicator proper.

In operating a geared angle indicator fitted with the device in accordance with the present invention, rotation of indicating disks is accomplished only after friction of finger 30 against the "brake drum" of disk 25 has been overcome. Since this friction load is uniform, the teeth are required to contact one another with uniform pressure. Additionally, the friction may be adjusted to cause substantially uniform thickness in any oil film between the teeth. In consequence, results obtained with the device described, used where gears mesh with desired clearance play and where angle measurements are taken by motion in one direction only, prove that it renders a geared angle indicator capable of accuracy uniformly consistent with the accuracy inherent in its gears.

Figure 3:
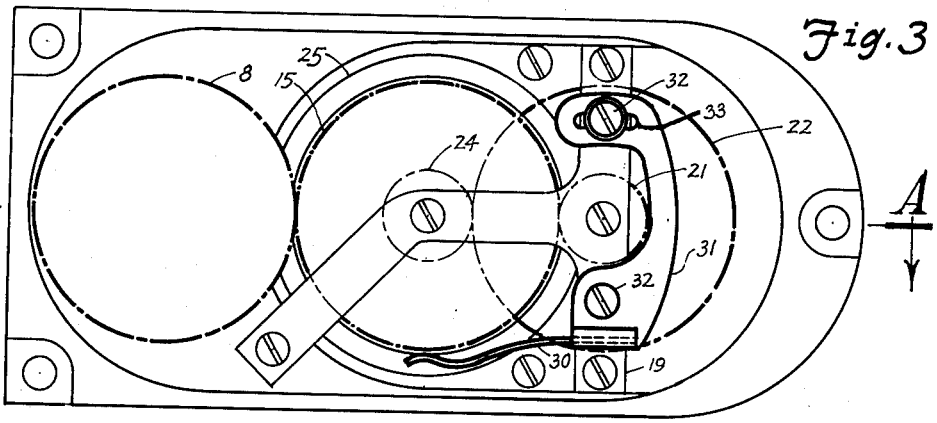
Fig. 3 is a plan view of the geared angle indicator shown in Fig. 1, the upper portion of the casing being removed.
Figure 4:
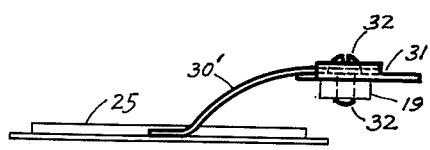
Fig. 4 is a side elevation to illustrate another embodiment of the present invention.

A slightly different embodiment of friction brake means or finger is shown in Fig. 4. The principles of this embodiment are the same as in the above-described embodiment shown in Figs. 1 through 3. In Fig. 4, it will be seen that the friction finger 30' is supported by the adjusting plate 31 in such a manner that the outer or friction end of finger 30' bears against the lower face of the peripheral flange on disk 25. It will be understood that Fig. 4 illustrates the friction finger 30' in reverse position to its actual operative position, the latter being that illustrated in Fig. 1.

From the foregoing, it will be seen that the present invention provides several embodiments of friction brake means incorporated in a geared angle indicator for purposes of rendering more accurate than heretofore possible readings of angles indicated by the instrument. The friction afforded by the tension springs of these embodiments is relatively light and imposes no undue burden or wear upon the disk engaged by either embodiment of spring or upon the gear train affected by such friction. Said friction means is simple and relatively inexpensive as well as highly effective to achieve the desired purpose.

While the invention has been shown and illustrated in its several preferred embodiments, and has included certain details, it should be understood that the invention is not to be limited to the precise details herein illustrated and described since the same may be carried out in other ways falling within the scope of the invention as claimed.

I claim:
1. Geared angle indicator mechanism for multiplying the angular movement of one element relative to another to facilitate the visual determination of said angular movement with preciseness, said indicator mechanism comprising in combination, a plurality of indicia-bearing means readable relative to each other and one of the same being movable relative to the other for purposes of indicating the angular movement between said elements, a gear train interconnected between one of said elements and said movable indicia-bearing means for purposes of driving the latter and increase the movement thereof relative to that of said element, the other of said indicia-bearing means being connected to said other relatively movable element, and friction means positioned to interengage the driven indicia-bearing means and impose light friction thereon for purposes of minimizing play between the elements of the gear train and movable indicia-bearing means while the latter is being driven, whereby accuracy of readings obtained from said indicia-bearing means is assured.

2. The geared angle indicator of claim 1 further including a member adjustably mounted and supporting said friction means, whereby adjustment of said member varies the amount of friction produced by said friction means.

3. The geared angle indicator of claim 1 further characterized by said friction means comprising resilient means positioned to have a portion thereof slidably interengage said movable indicia-bearing means adjacent the periphery thereof.

4. The geared angle indicator of claim 1 further characterized by said friction means comprising a leaf spring having a portion slidably interengaging said driven indicia-bearing means.

5. The geared angle indicator set forth in claim 1 further characterized by said other indicia-bearing means being fixed relative to the other element.

6. The geared angle indicator of claim 4 further including a supporting member pivotally supported for adjustment relative to said other indicia-bearing member, and said leaf spring being connected at one end thereto for support thereby, said supporting member when adjusted from one position to another varying the frictional force exerted by said friction means upon said driven indicia-bearing means.

7. The geared angle indicator of claim 2 further characterized by said supporting member being pivotally supported, and a locking screw extending through a slot in said member and operable to lock said member in a desired position of adjustment.

References Cited in the file of this patent
UNITED STATES PATENTS

| | | |
|---|---|---|
| 1,384,105 | Starrett et al. | July 12, 1921 |
| 2,231,036 | Suverkrop | Feb. 11, 1941 |
| 2,350,733 | Drotning | June 6, 1944 |